No. 767,392.                                                                                      Patented August 16, 1904.

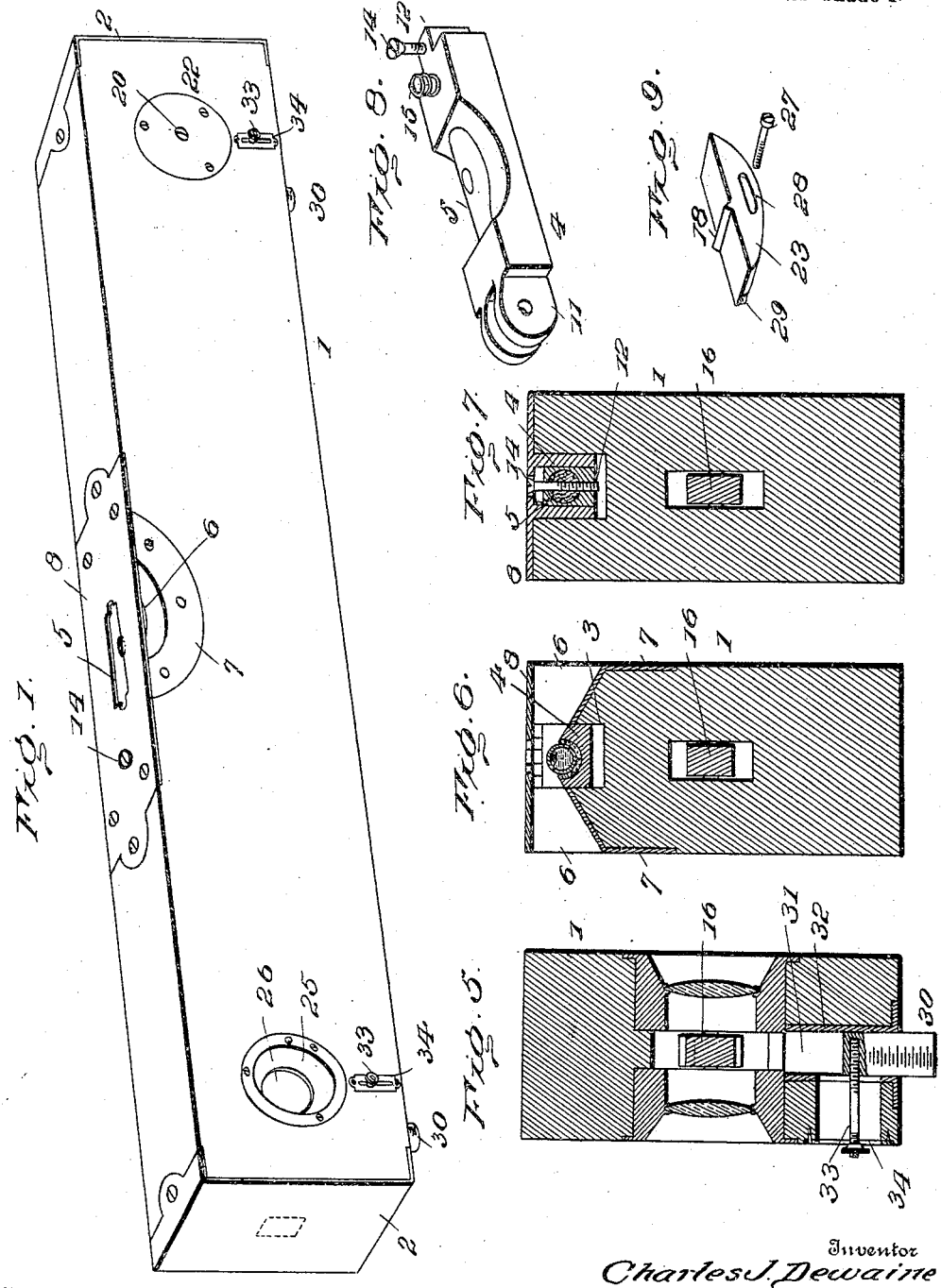

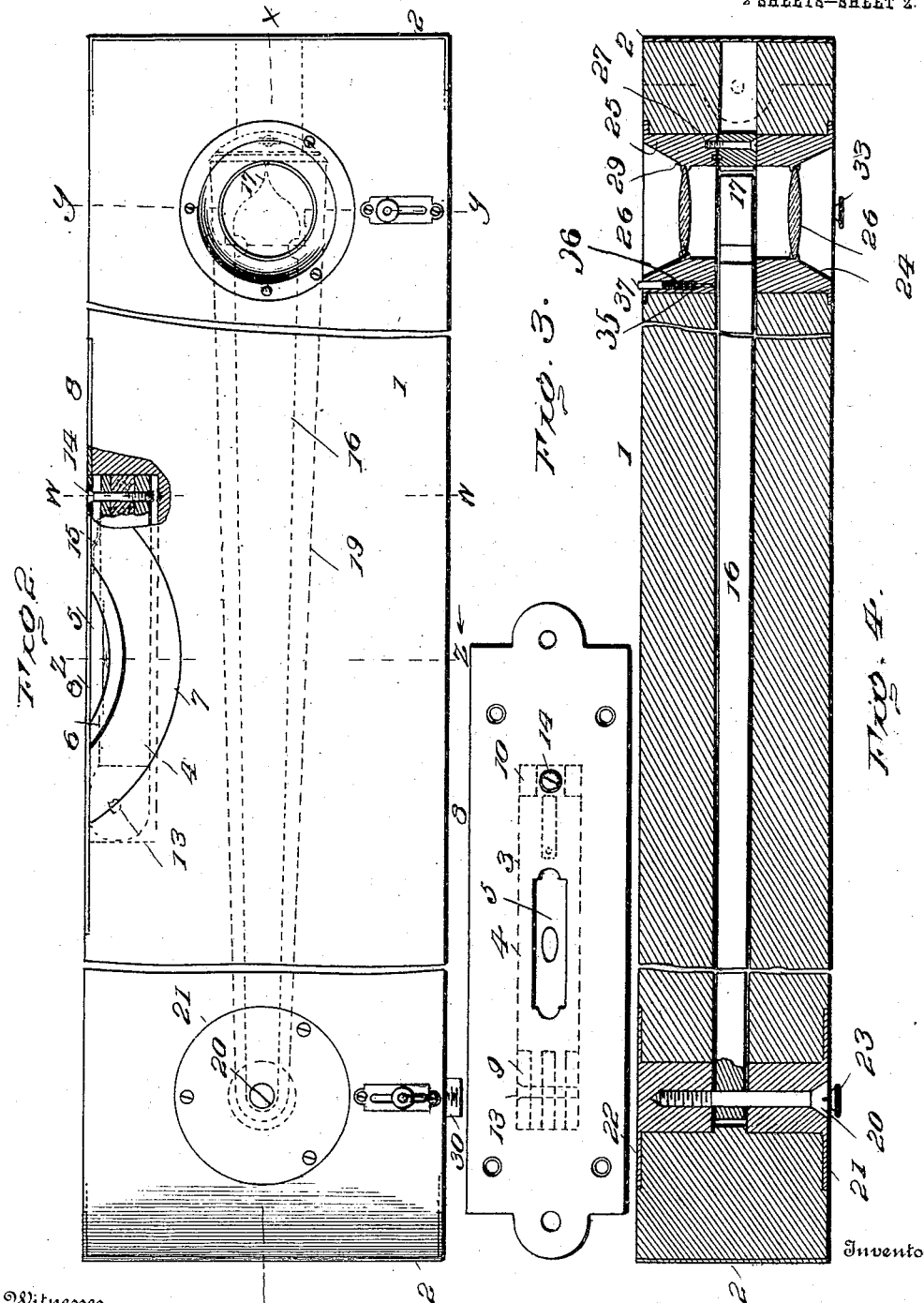

UNITED STATES PATENT OFFICE.

CHARLES J. DEWAINE, OF BATH, NEW YORK.

PLUMB AND LEVEL.

SPECIFICATION forming part of Letters Patent No. 767,392, dated August 16, 1904.

Application filed October 1, 1903. Serial No. 175,365. (No model.)

*To all whom it may concern:*

Be it known that I, CHARLES J. DEWAINE, a citizen of the United States, residing at Bath, in the county of Steuben and State of New York, have invented certain new and useful Improvements in Plumbs and Levels, of which the following is a specification.

This invention aims to devise an instrument for builders for leveling and plumbing work which is sensitive and not affected by wind, thereby free from the annoyance incident to the use of the ordinary level and plumb and which will enable the parts to be accurately adjusted and conveniently and easily assembled.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a combined level and plumb embodying the invention. Fig. 2 is a side elevation thereof, on a larger scale, parts being broken away. Fig. 3 is a top plan view of the spirit-level and parts intimately associated therewith. Fig. 4 is a longitudinal section of the instrument on the line X X of Fig. 2. Fig. 5 is a cross-section on the line Y Y of Fig. 2. Fig. 6 is a section on the line Z Z of Fig. 2. Fig. 7 is a section on the line W W of Fig. 2. Fig. 8 is a perspective view of the adjustable block or support carrying the tube provided with the air-bubble. Fig. 9 is a perspective view of the block provided with the indicator for coöperation with plumb-bar.

Corresponding and like parts are referred to in the following description and indicated in all the views of the drawings by the same reference characters.

The body of the instrument is indicated at 1 and may be of any dimensions and constructed of any material commonly employed in the manufacture of spirit-levels. As shown, the body 1 is preferably a wooden bar, stock, or frame reinforced at its extremities by metal caps 2, which may be of brass or other metal either cast, stamped, or formed of sheet metal. The leveling appliance is located midway of the ends of the body or stock 1 and is let into an edge thereof, so as to come flush therewith. The body 1 is mortised, as shown at 3, to receive the block 4, provided with the tube 5, containing the liquid and the air-bubble constituting the essential parts of the level. The sides of the body are cut away opposite the mortise 3, as shown at 6, the wall of the cut-away portion 6 being longitudinally curved and outwardly and downwardly flared, so as to admit of a wide range of observation of the level. The cut-away portion 6 is reinforced by metal pieces 7, which cover the flared portion of the cut-away part 6 and the side of the body 1 adjacent thereto, as shown most clearly in Figs. 1 and 6. A plate 8 is let into the edge portion of the body 1, having the mortise 3 and cut-away portion 6 and covers the same and is provided near each end with pendent lugs 9 and 10 to receive the projections 11 and 12 at opposite ends of the block 4. An observation-opening is provided central of the plate 8 to admit of inspecting the level from above. The projections 11 at one end of the block 4 interleave with the projections 9 of the plate 8 and are pivotally connected thereto by the fastening 13, which is passed through openings formed in said projections in coincident relation. A set-screw 14 has its head countersunk in the plate 8 and its body threaded into the projection 12, and by turning said set-screw either to the right or to the left the block or support 4 may be moved at one end to accurately position the level and true the same. A spring 15 is interposed between an end portion of the plate 8 and the end of the block 4 provided with the projection 12, so as to move said end of the block 4 inward when backing or loosening the screw 14. When turning the set-screw 14 in the opposite direction, the swinging end of the block 4 is moved outward against the tension of the spring 15. This spring 15 serves in the capacity of a cushion and relieves the part 4 from any shock or jar incident to the instrument receiving a smart blow or fall. The block or support 4 may be of brass or other metal and is cut away intermediate of its ends to expose the tube 5 and is longitudinally bored to provide an opening into which said tube is inserted or removed.

The plumb-bar 16 is located lengthwise of the body or stock 1 and is pivoted thereto at one end, and its opposite end terminates in a point 17, which coöperates with a point or indicator 18 to determine the vertical condition of any work to be plumbed. The plumb-bar 16 is thin and wide and may be of metal or other suitable material and is arranged within a longitudinal opening 19 of the body 1, said opening 19 having its sides parallel and its opposite edges slightly divergent from the pivotal end of the plumb-bar 16 to admit of oscillatory movement of said bar. The pivot-fastening 20, from which the plumb-bar 16 is suspended, consists of a machine-screw and serves to connect corresponding bosses of plates 21 and 22, let into opposite sides of the body 1 near an end thereof. Upon removal of the fastening 20 the parts 21 and 22 may be disengaged from the body 1, and the plumb-bar 16 is free to be removed through an end of the body 1, the opening 19 being closed at the open end by a metal end piece 2, as indicated most clearly in Fig. 4.

A transverse opening is provided near the opposite end of the body 1 and receives the block 23, carrying the indicator 18, and admits of observation of the point 17. This opening is provided with complemental rings 24 and 25, which are secured therein in any effective manner, said rings being flanged at their outer ends to provide a neat finish and to receive screws or like fastenings employed for holding the rings in place. Glass plates 26 are fitted in each of the rings 24 and 25 and are preferably of lenticular form, so as to facilitate reading or inspection of the points 17 and 18. The portion of the rings 24 and 25 exterior to the lenticular plates 26 flares outwardly to increase the range of observation. The rings 24 and 25 are spaced apart a distance to receive the lower end of the plumb-bar and the block 23, the latter being secured to one of the rings, as 25, by means of the clamp-screw 27, which passes through a slot 28 of the block 23. This construction admits of moving the block, so as to properly position the indicator 18 with reference to the point 17, so as to render the instrument true.

The block 23 is directed in its transverse adjustment by any means, and, as shown, a spline 29 coöperates with corresponding grooves in the block 23 and the inner end of the ring 25. It is to be understood that extreme care is to be taken in the setting of the ring 25 so as to insure the spline 29 occupying a position at a right angle to the length of the body or stock 1. The clamp-screw 27 and slot 28 are protected by the ring 24, and when it is required to adjust the block 23 the ring 24 must be removed in order to admit of access being had to the parts 27 and 23.

It frequently happens that timber to be plumbed is provided with protuberant parts or swelled portions, and in order to clear these parts the body or stock 1 is provided near each end with rests 30, which consist of graduated rods or bars slidably mounted in openings 31, formed in the body 1 and reinforced by means of tubes 32, the outer ends of which are flanged and apertured to receive the fastenings employed for securing the tubes in place. Each of the rests 30 is operable by means of a screw 33, threaded therein, the head of which is adapted to bind against a plate 34 let into the stock 1, so as to come flush with the side thereof. The plate 34 is slotted to register with a corresponding slot formed in the body 1 and adjacent side of the tube 32. By loosening the screw 33 the rest 30 may be projected to any point within the range of movement by means of the screw 33, said rest being secured in the adjusted position by retightening of the screw 33. The head of the screw 33 may be flush with the plate 34 and side of the body 1 or may project, as shown, the latter being the preferable construction, as it provides a knob or finger-piece to facilitate the adjustment of the rests.

The plumb-bar 16 is of a thickness to fit comfortably within the opening 19 without binding and to swing freely, and in order to check the oscillations when using the instrument for plumbing a brake has been devised and consists of a shoe 35, spring 36, and pressure-pin 37, the parts being mounted in an opening formed in a portion of the ring 25. The spring 36 is delicate, so as to exert a light pressure upon the shoe 35 when the part 37 is pressed upon. The pressure-piece 37 projects slightly beyond the side of the body 1 or outer end of the ring 25. When the instrument is used in the capacity of a plumb-line, the plumb-bar 16 may be quickly brought to a state of rest by exerting pressure upon the outer end of the part 37, said pressure being transmitted to the shoe 35 by means of the spring 36. It will be observed that all the parts are housed and protected and are not affected by air-currents, which materially interfere with the successful use of the ordinary plumb-line.

Having thus described the invention, what is claimed as new is—

In a level, the combination of a plate having an observation-opening and pendent lugs near each end, a block provided with the tube having the indicating-bubble and having projections at opposite ends for coöperation with the lugs at corresponding ends of said plate, a pin pivotally connecting the block to the plate by being passed through corresponding openings in matching projections and lugs, a set-screw threaded into the projection at the swinging end of the block and loosely fitted into an opening of said plate, and a spring interposed between the block and plate, substantially as specified.

In testimony whereof I affix my signature in presence of two witnesses.

CHARLES J. DEWAINE. [L. S.]

Witnesses:
 GENEVIEVE MATTHEWS,
 EMILY H. ENGLAND.